United States Patent Office 3,415,930
Patented Dec. 10, 1968

3,415,930
CERTAIN PARENTERALLY ACTIVE ANTHELMINTIC TETRAHYDROPYRIMIDINES
William G. Huber, Urbana, Ill., assignor to Chas. Pfizer & Co., Inc., New York, N.Y., a corporation of Delaware
No Drawing. Filed Apr. 8, 1964, Ser. No. 358,379
2 Claims. (Cl. 424—251)

ABSTRACT OF THE DISCLOSURE

The control of helminthiasis in domestic animals by the parenteral administration of a series of 2-(2-thenylmercapto) - $\Delta^2$-imidazolines, 2 - (2 - thenylmercapto)-$\Delta^2$-tetrahydropyrimidines, their N-methyl derivatives, and the non-toxic water-soluble acid addition salts thereof.

---

This invention relates to the use of a series of anthelmintic agents an their non-toxic acid addition salts which are especially effective via the parenteral route of administration. More particularly, it relates to the use of 2-(2-thenylmercapto) - $\Delta^2$-imidazolines, 2-(2-thenylmercapto)-$\Delta^2$-tetrahydropyrimidines, the N-methyl derivatives and the non-toxic acid addition salts thereof as agents for the veterinary control of helminthiasis in domestic animals.

Helminthiasis, the infestation of the animal body by various species of parasitic worms, is perhaps the most common, most serious and most widespread disease in the world today. Although the economic significance of this disease has led to extensive research for new and more effective anthelmintics, most of the countermeasures developed to date have not been entirely satisfactory for one or more reasons; e.g. poor therapeutic index, specificity of action, high cost, low activity, limited anthelmintic spectrum.

The anthelmintic activity of 2-(2-thenylmercapto)-$\Delta^2$-imidazoline and its water soluble pharmaceutically acceptable salts via oral administration is described in U.S. 2,956,923. The usual method, indeed, the almost universal method for the treatment of helminthic infections, is the oral administration of the drug of choice. The treatment of helminthiasis by the parenteral (e.g. subcutaneous, intramuscular, intracutaneous, intraperitonal) administration of suitable drugs has not been practical in view of the nature and location of the parasites involved and the poor activity of available drugs by the parenteral route.

Commercial anthelmintic agents now in use are specific in their action, both with respect to the helminth and to the host. The indiscriminate application of the term "anthelmintic" to drugs which have a toxic action upon parasitic worms belonging to more than one animal phylum erroneously conveys the impression that the organism being acted upon belongs to a biological classification comparable to that which encompasses bacteria or fungi since these organisms are subject to attack by antibacterial and antifungal agents. However, this is not the case. Roundworms and flatworms belong to different animal phyla and there is no reason to believe that an anthelmintic effective against *Ascaris lumbricoides* (phylum, Nematodes) will have an effect on *Hymenolepsis nana* or *Taenia saginata* (phylum, Platyhelminths). Indeed, activity against one phylum cannot be extrapolated to another phylum.

The screening procedures employed in the evaluation of potential anthelmintic agents involve in vitro tests with worms of different types with respect to a stimulating, paralyzing or killing effect. The agents selected in this manner are then, if their solubility, toxicity and stability in the animal body warrants, investigated further in worm-infected animals.

The shortcomings of the in vitro tests become obvious when one considers the following points: the drug may be absorbed or chemically altered before it reaches the helminth; the helminth may be coated with mucous or other substance which serves as a barrier to drug penetration; the physical location of the helminth may be such that the drug does not reach it. The location of the helminth in the host, in fact, constitutes an important reason for the specificity of anthelmintic agents. Moreover, the effectiveness of anthelmintic agents against the same or closely related worm species varies greatly from host to host.

In vivo studies on animal parasites as a means of determining anthelmintic activity against definite species of human parasites are subject to many of the same objections as in vitro studies. Different species or varieties of parasites, great differences in the anatomy and physiology of the intestinal tracts of the hosts, varying food habits and different intestinal contents serve to complicate the experiments. The drug must be tested against the particular helminth in the particular host in order to obtain definitive results.

There is at present no broadly effective anthelmintic drug commercially available. While more than one roundworm may be susceptible to a given drug, no drug is recommended for therapy against both tapeworms and roundworms.

Acording to the present invention, it has now been unexpectedly found that 2-(2-thenylmercapto)-$\Delta^2$-tetrahydropyrimidines, 2 - (2 - thenylmercapto) - $\Delta^2$-imidazolines and their N-methyl derivatives having the general formula:

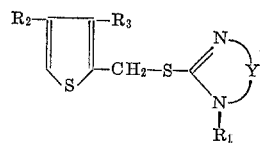

and the non-toxic acid addition salts thereof wherein $R_1$ is selected from the group consisting of hydrogen and methyl; each of $R_2$ and $R_3$ is individually selected from the group consisting of hydrogen, methyl, ethyl, chloro and bromo; and Y is lower alkylene and is selected from the group consisting of ethylene (—$CH_2$—$CH_2$—), trimethylene (—$CH_2$—$CH_2$—$CH_2$—), 1 - methyltrimethylene (—$CH(CH_3)$—$CH_2$—$CH_2$) and 2 - methyltrimethylene (—$CH_2$—$CH(CH_3)$—$CH_2$—), are surprisingly effective agents in the control of helminthiasis in domestic animals when administered parenterally.

The non-toxic acid adition salts, that is, those salts which are non-toxic at the dosages used, of the above mentioned bases which may be employed are the water soluble salts such as the hydrochloride, hydrobromide, phosphate, nitrate, sulfate, acetate, citrate, gluconate, etc.

These compounds are also less toxic by the parenteral route of administration than by the oral route. The unexpected increase in activity and lower toxicity produce a favorable and improved therapeutic index in comparison to that obtained via oral administration. These agents are active against both the mature and immature forms of helminths of the families Ancyclostonidae, Strongylidae and Trichostrongyliae. They are especially effective against the gastrointestinal parasites of ruminants (e.g. sheep, cattle, goats) and of non-ruminants such as dogs, cats, horses.

Subcutaneous and intramuscular injections are the preferred methods of parenteral injection for several reasons; simplicity, convenience and the compounds appear less toxic. According to the present invention, anthelmintic agents described herein or their acid addition salts are administered parenterally, e.g. by subcutaneous or intramuscular injection, to animals suffering from helminthiasis of various types in a dosage of from about 10 mg./kg. to about 60 mg./kg. of body weight. A single injection is generally sufficient but, in the event multiple doses are employed, the injection is repeated at a suitable interval, e.g., monthly. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as hyaluronidase (spreading factor), local anesthetics and inorganic salts to afford desirable pharmacological properties.

Administration of these anthelmintic agents in combination with hyaluronidase avoids local irritation. An increase in the rate of absorption of the drug is observed and the pain due to swelling and distention is greatly reduced if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the animal following injection of the drug preparation.

Many of the acid addition salts of the 2-(2-thenylmercapto) - $\Delta^2$ - tetrahydropyrimidines, the 2 - (2-thenylmercapto)-$\Delta^2$-imidazolines and their N-methyl derivatives are readily soluble in water. For the purpose of this invention solutions having concentrations ranging from about 10% up to the limit of solubility of the salt are useful. Solutions having at least about 20% concentration are generally favored since such solutions minimize the volume of solution which must be administered.

In view of the slight tendency of aqueous solutions of these materials to hydrolyze upon prolonged storage, it is preferred to make up the solution just prior to administration. The ready solubility of the acid addition salts in water renders this approach practical. Dry mixtures containing the active ingredients together with salt (sodium chloride) and/or buffering agents or local anesthetics are prepared for extemporaneous use. A concentration of active ingredient in such mixtures of at least about 50% is useful.

These agents, it should be noted, can be used either in the form of solutions or suspensions, aqueous or non-aqueous. The preferred vehicles for use with these anthelmintic agents for parenteral administration are the aqueous vehicles such as are recited above. The acid addition salts, because of their water solubility, represent the preferred forms of these anthelmintic agents. The free base forms are useful for the preparation of suspensions and compositions comprising a non-aqueous vehicle or liquid diluent of the type mentioned above.

The significantly greater efficacy of these anthelmintic agents via the parenteral, as opposed to the oral, route of administration is brought out by the following data for 2 - (2-thenylmercapto)-$\Delta^2$-imidazoline hydrochloride. Six sheep, selected at random were divided into three pairs, and administered the aforementioned anthelmintic agent orally as a 2% aqueous solution at doses of 20 mg., 40 mg. and 80 mg./kg., respectively. The two sheep given the 80 mg./kg. dose died within 24 hours after administration. The remaining four sheep were administered two additional doses equivalent to the first dose at 8-day intervals.

The degree of infestation was determined by egg counting (Stoll's method) and the results expressed in eggs of Strongyles/gm. of fecal material, and by cultivation of larvae. In this method, 20 grams of fecal material is kept in a humid atmosphere at 28° to 30° C. The infestive larvae (L3) are counted and their number given in grams of fecal material.

The results obtained by cultivation of larvae showed a net decrease in the number of larvae (L3) originating from the eggs eliminated following treatment.

TABLE 1.—ORAL ADMINISTRATION OF 2-(2-THENYLMERCAPTO)-$\Delta^2$-IMIDAZOLINE HYDROCHLORIDE

| | Mg./kg. Dose | Before Treatment | No. of Larvae 6 Days After after Treatment | | |
|---|---|---|---|---|---|
| | | | No. 1 | No. 2 | No. 3 |
| Sheep: | | | | | |
| A | 20 | 180 | 15 | 10 | |
| B | 20 | 280 | 79 | 10 | |
| C | 40 | 100 | 15 | 40 | |
| D | 40 | 75 | 40 | 15 | |

The results obtained by egg counts show no such diminution of egg production.

| | Mg./kg. Dose | Before Treatment | No. of Eggs 6 Days After Treatment | | |
|---|---|---|---|---|---|
| | | | No. 1 | No. 2 | No. 3 |
| Sheep: | | | | | |
| A | 20 | 300 | 100 | 100 | 100 |
| B | 20 | 300 | 100 | 100 | 100 |
| C | 40 | 150 | 200 | 0 | 100 |
| D | 40 | 0 | 0 | 0 | 0 |

Four sheep heavily and naturally infested with digestive Strongyles were each administered a single dose of from 20 mg. to 30 mg./kg. of 2-(2-thenylmercapto)-$\Delta^2$-imidazoline in the form of a 20% aqueous suspension by subcutaneous injection. Three sheep from the same naturally infested flock were held as controls.

A count of the number of eggs eliminated by these sheep before and after treatment showed a spectacular drop in the number of eggs eliminated. The egg counts were made for a 15-day period prior to treatment and for 15 days after treatment. The values reported below are average values.

TABLE II.—EGG COUNT OF SHEEP BEFORE AND AFTER SUBCUTANEOUS INJECTION OF 2-(2-THENYLMERCAPTO)-$\Delta^2$-IMIDAZOLINE

| | Average Egg Count | | Dose, mg./kg. |
|---|---|---|---|
| | Before | After | |
| Sheep: | | | |
| E | 2,525 | 430 | 30 |
| F | 616 | 66 | 30 |
| G | 540 | 83 | 22 |
| H | 316 | 183 | 20 |

On post-mortem examination the following parasites were identified in the treated and controlled sheep.

TABLE III.—SUBCUTANEOUS INJECTION OF 2-(2-THENYLMERCAPTO)-Δ²-IMIDAZOLINE

| | Sheep | | | | | | | | |
|---|---|---|---|---|---|---|---|---|---|
| | E | F | G | H | | J | K | L | |
| Treatment | 30 mg./kg. | 30 mg./kg. | 22 mg./kg. | 20 mg./kg. | Avg. | Controls | | | Avg. |
| Abomassum: | | | | | | | | | |
| Haemonchus | 48 | 0 | 11 | 0 | 15 | 55 | 0 | 42 | 24 |
| Ostertagia | 996 | 108 | 264 | 112 | 370 | 1,716 | 3,007 | 2,002 | 2,265 |
| Trichostrongylus | 1,656 | 0 | 11 | 24 | 423 | 1,155 | 3,128 | 938 | 1,740 |
| Cooperia | 0 | 12 | 0 | 0 | 3 | 264 | 0 | 0 | 88 |
| Small Intestine: | | | | | | | | | |
| Ostertagia | 12 | 10 | 0 | 0 | 8 | 0 | 0 | 0 | 0 |
| Trichostrongylus | 0 | 20 | 48 | 0 | 17 | 243 | 36 | 240 | 173 |
| Cooperia | 0 | 12 | 0 | 0 | 3 | 0 | 6 | 48 | 18 |
| Bunostomum | 0 | 0 | 0 | 0 | 0 | 351 | 94 | 6 | 150 |
| Nematodirus | 0 | 0 | 0 | 0 | 0 | 1,404 | 191 | 318 | 638 |
| Chabertia | 0 | 0 | 0 | 0 | 0 | 0 | 2 | 0 | 1 |
| Large Intestine: | | | | | | | | | |
| Chabertia | 0 | 4 | 0 | 0 | 1 | 57 | 319 | 100 | 159 |
| Oesophagostum | 4 | 12 | 0 | 0 | 4 | 2 | 332 | 9 | 114 |
| Total | 2,716 | 178 | 334 | 136 | | 5,247 | 7,185 | 3,703 | |
| Average | | | | | 844 | | | | 5,371 |

The outstanding effectiveness of 2-(2-thenylmercapto)-Δ²-imidazoline in reducing the parasite burden and egg production thereby is clearly evident from the above data. In a series of other tests naturally infested sheep (147) treated with 20 mg./kg. of this anthelmintic agent likewise showed a rapid and highly significant decrease in egg production. In a few sheep kept under observation for one month, the elimination of eggs and, therefore, egg production stopped for one month following a 20 mg./kg. dose by subcutaneous injection. Larger doses of 40–60 mg./kg. produced excellent results. Two out of three sheep thus treated responded negatively to the egg count tests 48 hours after injection. A dose of 15 mg./kg. appears to irregularly slow down egg production which not infrequently returns to the pre-treatment level within a fortnight. Post-mortem examination of some of the sheep revealed that the decrease in egg production was associated with a disappearance of mature parasites.

Further, one sheep which excreted an average of 1500 eggs of digestive Strongyles (Trichostrongyloide, Strongylides, Ankylostomides) per gram was subcutaneously injected with a 5% aqueous saline solution of 2-(2-thenylmercapto)-Δ²-imidazoline hydrochloride at a dosage of 20 mg./kg. Egg excretion practically stopped within less than 48 hours following injection and continued at a very low level for approximately one month. Post-mortem examination revealed the decrease in egg production was associated with the disappearance of mature parasites.

In addition to their outstanding efficacy as anthelmintic agents via parenteral administration, the 2-(2-thenylmercapto)-Δ²-imidazolines, 2-(2-thenylmercapto)-Δ²-tetrahydropyrimidines and their acid addition salts are also larvacidal against Strongyloides, Trichostrongylus and Haemonchus. Larvae of these families, cultured from fecal material of infected sheep, when exposed to aqueous solutions of 2-(2-thenylmercapto)-Δ²-imidazoline hydrochloride soon become immobilized and die. The greater the concentration of active ingredient, the shorter the time required for immobilization and death. The 2-(2-thenylmercapto)-Δ²-imidazoline hydrochloride and related compounds described herein are, therefore, valuable for preventing infection and re-infection by spraying the areas, e.g. pastures, pens, used by animals. By spraying areas used or to be used by animals prophylaxis is realized and, by parenterally injecting the animals before placing them in such areas, the development of clinical disease is prevented.

It should be noted these agents can be used alone or in combination with each other or other drugs. In the case of the 3- or 4-substituted derivatives ($R_2$ or $R_3$ are not hydrogen) it is more convenient and practical to prepare and use a mixture of the 3- and 4- substituted derivatives rather than to prepare the pure 3- or 4- derivatives.

The 2-(2-thenylmercapto)-Δ²-imidazolines and the 2-(2-thenylmercapto)-Δ²- tetrahydropyrimidines and their acid addition salts are prepared by known methods. The most convenient route comprises reaction of the appropriate 2-thenyl chloride with the desired alkylene thiourea. The 2-thenyl chlorides are prepared from the corresponding thiophene by chloromethylation according to Bicke et al. (J. Am. Chem. Soc. 64, 477, 1942) as illustrated in U.S. 2,956,923. Alternatively, they are obtained by reacting the desired thiophene precursor with dimethyl formamide as described by Campaigne and Archer, J. Am. Chem. Soc., 75, 989–91 (1953). The 2-aldehyde thus produced is reduced to the alcohol and then chlorinated by known methods to give the corresponding 2-thenyl chloride.

The alkylene thioureas are obtained by reaction of the corresponding alkylenediamine with carbon disulfide according to known procedures.

2-(2-thenylmercapto)-Δ²-imidazoline and its acid addition salts are prepared as described in U.S. 2,956,923. The procedure for making 2-(2-thenylmercapto)-Δ²-tetrahydropyrimidine is given in Australian Patent 235,865.

When prepared as described above, the valuable anthelmintic agents are obtained as their hydrochloride salts. Since the free bases are insoluble in water, they are readily obtained from the hydrochloride salts by neutralization of an aqueous solution of said salts and thence converted to other salts as described herein.

The preparation of various acid addition salts is achieved by simply dissolving the free base in aqueous or alcoholic solutions of the desired acids. The salts are recovered by precipitation with a non-solvent, by evaporation, or by lyophilization when an aqueous solution is employed. The latter is an extremely convenient procedure which provides the pure salt when the pure base and the calculated quantity of aqueous acid is employed. In this manner, the hydrobromide, acetate, phosphate, nitrate, sulfate, citrate, gluconate, benzoate, propionate, and butyrate salts are prepared. Other conventional means for the preparation of salts can be employed such as treatment of one 2-(2-thenylmercapto)-imidazole salt with a metal salt in a solvent suitable for both reactants to provide for precipitation of the undesired anion and replacement by the anion of the metal salt. For instance, the hydrochloride salt dissolved in aqueous solution and treated with silver nitrate results in the precipitation of silver chloride and formation of the nitrate salt. Anion exchange resins can also be employed.

The following examples are provided to illustrate the manner of practicing the present invention in greater detail. They are, however, not to be construed as limitations of this invention, many variations of which are possible without departing from the scope and spirit thereof.

Example I.—Preparation of 2-(2-thenylmercapto)-Δ²-tetrahydropyrimidine hydrochloride Twenty-seven grams of thenylchloride(2-chloromethylthiophene) is added over a ten-minute period to a stirred, refluxing solution of 25 g. of trimethylene thiourea in 100 ml. of methanol. The mixture is refluxed for an additional half-hour, then cooled to 0° C. and slowly poured into 250 ml. of diethylether with stirring. After 15 minutes the product is collected by filtration, washed with diethyl ether and air dried. The product is a white crystalline solid, readily soluble in water, which melts at 152° C.

Example II.—Preparation of 2-(3- and 4-methyl-2-thenylmercapto)-Δ²-imidazoline hydrochloride (A) To a solution of ethylene thiourea (9.5 g.) in 20 ml. of dry methanol at reflux there is added a mixture of approximately equal parts of 3- and 4-methylthenyl chloride (13.6 g.). The resulting mixture is refluxed for one hour, cooled and the liquid decanted from the small amount of solid present. Ether is added to the liquid to precipitate the product. After several recrystallizations from isopropyl alcohol-ether the product, a white microcrystalline solid melts at 160° C. It consists of approximately equal amounts of the 3- and 4-methyl derivatives.

(B) Repetition of this procedure but using pure 3-methylthenyl chloride, separated from the mixture by gas-liquid chromatography, produces the pure 2-(3-methyl-2-thenylmercapto)-Δ²-imidazoline hydrochloride. In like manner, the 4-methyl isomer is prepared.

Example III.—Preparation of 2-(2- and 4-methyl-2-thenylmercapto)-Δ²-tetrahydropyrimidine hydrochlorides (A) Following the procedure of Example II–A but using trimethylene thiourea in place of ethylene thiourea produces a mixture of approximately equal amounts of 2-(3 - methyl-2-thenylmercapto)-Δ²-tetrahydropyrimidine hydrochloride and its 4-isomer; melting points 149–150.5° C. are obtained.

(B) By the same procedure but using pure 3-methylthenyl chloride or 4-methylthenyl chloride, the pure compounds are produced.

The 3- and 4-methylthenyl chlorides used in Examples II and III are produced according to the procedure of Campaigne and Archer, J. Am. Chem. Soc. 75, 989–91 (1953) whereby 3-methylthiophene is reacted with dimethyl formamide to give 3- and 4-methylthiophenealdehyde. Gas-liquid chromatography showed two equal peaks to be present. The thus produced mixture of aldehydes is reduced to the alcohol and thence to 3- and 4-methylthenyl chlorides by chlorination (thionyl chloride) according to known methods.

Example IV.—Preparation of 1-methyl-2-(2-thenylmercapto)-Δ²-imidazoline hydrochloride To a solution of N-methylimidazoline (8.7 g.) in 100 ml. of ethanol at reflux there is added with stirring thenyl chloride (11 g.). The reaction mixture is refluxed for one hour then stripped to one-third volume. The concentrate is cooled and ether added to precipitate a white waxy solid. The solid is allowed to settle, the ethereal layer decanted and treated with more ether to precipitate additional product. The combined solids are dried in vacuo; M.P. 112–113° C.

Example V

The following 2-(2-thenylmercapto)-Δ²-imidazoline hydrochlorides and 2-(2-thenylmercapto)-Δ²-tetrahydropyrimidine hydrochlorides are prepared from the appropriate reactants by the procedure of Example I.

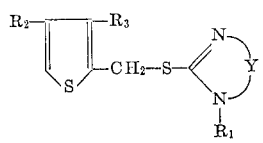

| $R_1$ | $R_2$ | $R_3$ | Y |
|---|---|---|---|
| H | Br | H | $-CH_2CH_2-$, $-CH_2CH_2CH_2-$, $-CH_2CH(CH_3)CH_2-$, $-CH(CH_3)CH_2CH_2-$ |
| H | H | Br | $-CH_2CH_2-$, $-CH_2CH_2CH_2-$, $-CH_2CH(CH_3)CH_2-$, $-CH(CH_3)CH_2CH_2-$ |
| H | Br | Br | $-CH_2CH_2-$, $-CH_2CH_2CH_2-$, $-CH_2CH(CH_3)CH_2-$, $-CH(CH_3)CH_2CH_2-$ |
| H | $CH_3$ | $CH_3$ | $-CH_2CH_2-$, $-CH_2CH_2CH_2-$, $-CH_2CH(CH_3)CH_2-$, $-CH(CH_3)CH_2CH_2-$ |
| H | $CH_3$ | Br | $-CH_2CH_2-$, $-CH_2CH_2CH_2-$, $-CH_2CH(CH_3)CH_2-$, $-CH(CH_3)CH_2CH_2-$ |
| H | H | Cl | $-CH_2CH_2-$, $-CH_2CH_2CH_2-$, $-CH_2CH(CH_3)CH_2-$, $-CH(CH_3)CH_2CH_2-$ |
| H | $C_2H_5$ | H | $-CH_2CH_2-$, $-CH_2CH_2CH_2-$, $-CH_2CH(CH_3)CH_2-$, $-CH(CH_3)CH_2CH_2-$ |
| H | H | $C_2H_5$ | $-CH_2CH_2-$, $-CH_2CH_2CH_2-$, $-CH_2CH(CH_3)CH_2-$, $-CH(CH_3)CH_2CH_2-$ |
| H | H | $CH_3$ | $-CH_2CH(CH_3)CH_2-$, $-CH(CH_3)CH_2CH_2-$ |
| H | $CH_3$ | H | $-CH_2CH(CH_3)CH_2-$, $-CH(CH_3)CH_2CH_2-$ |
| H | H | H | $-CH_2CH(CH_3)CH_2-$, $-CH(CH_3)CH_2CH_2-$ |
| $CH_3$ | H | $CH_3$ | $-CH_2CH_2-$, $-CH_2CH_2CH_2-$, $-CH_2CH(CH_3)CH_2-$, $-CH(CH_3(CH_2CH_2-$ |
| $CH_3$ | $CH_3$ | H | $-CH_2CH_2-$, $-CH_2CH_2CH_2-$ |
| $CH_3$ | H | Br | $-CH_2CH_2-$, $-CH_2CH_2CH_2-$ |
| $CH_3$ | H | Cl | $-CH_2CH_2-$ |
| H | Br | $CH_3$ | $-CH_2CH_2-$, $-CH_2CH_2CH_2-$ |

Example VI 2-(2-thenylmercapto)-Δ²-imidazoline hydrochloride is dissolved in water (10% solution) and neutralized by the slow addition of 6 N sodium hydroxide with vigorous stirring. The insoluble base is collected by filtration, washed with water until free of chloride then dried in air.

In like manner, the remaining hydrochloride salts of Examples I–V are converted to their respective bases.

Example VII (A) 2-(2-thenylmercapto) - Δ² - tetrahydropyrimidine (0.01 mole) is dissolved with stirring in a warm alcohol solution containing 0.01 mole of phosphoric acid. After twenty minutes the solvent is removed in vacuo leaving the desired salt.

(B) Repetition of procedure A but substituting an aqueous solution containing 0.01 mole sulfuric acid for the alcohol-phosphoric acid solution and lyophylizing the resulting clear solution gives the sulfate salt.

By means of these procedures the acetate, propionate, butyrate, nitrate, benzoate, citrate and gluconate salts of the bases of Example VI are prepared.

Example VIII

Six sheep, naturally infected with gastrointestinal nematodes (Haemonchus, Strongyloides, Nematodirus) and tapeworm are selected at random and divided into three pairs. The first pair (I–A and B) received 2-(2-thenylmercapto)-Δ²-imidazoline hydrochloride, 20% aqueous emulsion, subcutaneously at 30 mg./kg. body weight. The second pair (II–A and B) received 30 mg./kg. body weight of a 20% aqueous emulsion of 2-(2-thenylmercapto)-Δ²-imidazoline subcutaneously and the third, or control, pair (III–A and B) received only sterile distilled water.

Egg counts are made on the three days preceding the treatment and on the first, fourth and seventh days following treatment. Results are reported in Tables VI and VII, respectively.

TABLE VI.—EGGS PER GRAM OF FECES BEFORE MEDICATION

| Animal No. | Day—3 | | | | Day—2 | | | | Day—1 | | | |
|---|---|---|---|---|---|---|---|---|---|---|---|---|
| | N | S | H | Total | N | S | H | Total | N | S | H | Total |
| IV-A | 0 | 280 | 1,960 | 2,240 | 80 | 0 | 1,000 | 1,080 | 40 | 360 | 1,760 | 2,160 |
| IV-B | 0 | 1,280 | 2,000 | 3,280 | 0 | 480 | 1,040 | 1,120 | 40 | 200 | 3,040 | 3,280 |
| V-A | 0 | 560 | 2,000 | 2,560 | 0 | 280 | 1,320 | 1,600 | 0 | 320 | 1,200 | 1,520 |
| V-B | 0 | 640 | 1,440 | 2,080 | 40 | 200 | 1,880 | 2,080 | 0 | 0 | 1,520 | 1,520 |
| VI-A | 0 | 480 | 880 | 1,360 | 0 | 160 | 440 | 600 | 40 | 0 | 700 | 740 |
| VI-B | 40 | 550 | 1,840 | 2,400 | 0 | 560 | 2,360 | 2,920 | 0 | 680 | 880 | 1,560 |
| VII-A | 40 | 560 | 1,520 | 2,080 | 0 | 320 | 1,400 | 1,720 | 0 | 0 | 1,600 | 1,600 |
| VII-B | 0 | 100 | 1,400 | 1,500 | 0 | 280 | 1,320 | 1,600 | 0 | 0 | 1,040 | 1,040 |
| VIII-A | 0 | 0 | 2,960 | 2,960 | 0 | 0 | 1,880 | 1,880 | 0 | 0 | 2,320 | 2,320 |
| VIII-B | 40 | 1,040 | 1,880 | 2,960 | 0 | 0 | 1,720 | 1,720 | 0 | 0 | 2,040 | 2,040 |

Note.—N=Nematodirus; S=Strongyloids; H=Haemonchus.

TABLE VII.—EGGS PER GRAM OF FECES AFTER MEDICATION

| Animal No. | Drug, mg./kg. | Day+3 | | | | Day+6 | | | | Day+10 | | | |
|---|---|---|---|---|---|---|---|---|---|---|---|---|---|
| | | N | S | H | Total | N | S | H | Total | N | S | H | Total |
| IV-A | 10 | 0 | 0 | 0 | 0 | 0 | 120 | 200 | 320 | 0 | 320 | 320 | 620 |
| IV-B | 10 | 0 | 1,960 | 200 | 2,160 | 0 | 0 | 0 | 0 | 0 | 0 | 0 | 0 |
| V-A | 15 | 0 | 280 | 40 | 320 | 0 | 0 | 80 | 80 | 0 | 0 | 0 | 0 |
| V-B | 15 | 0 | 1,000 | 80 | 1,080 | 0 | 560 | 0 | 560 | 0 | 0 | 80 | 80 |
| VI-A | 20 | 0 | 40 | 0 | 40 | 0 | 0 | 0 | 0 | 0 | 560 | 0 | 560 |
| VI-B | 20 | 0 | 40 | 0 | 40 | 0 | 0 | 0 | 0 | 0 | 0 | 0 | 0 |
| VII-A | 25 | 0 | 1,160 | 0 | 1,160 | 0 | 0 | 0 | 0 | 0 | 0 | 0 | 0 |
| VII-B | 25 | 0 | 600 | 0 | 600 | 0 | 80 | 0 | 80 | 0 | 120 | 0 | 120 |
| VII-A | None | 0 | 0 | 1,880 | 1,880 | 0 | 0 | 2,600 | 2,600 | 0 | 0 | 2,040 | 2,040 |
| VIII-B | None | 40 | 40 | 1,760 | 1,840 | 0 | 0 | 2,680 | 2,680 | 0 | 0 | 2,640 | 2,640 |

Note.—N=Nematodirus; S=Strongyloids; H=Haemonchus.

lowing treatment. Results are tabulated below in Tables IV and V, respectively.

TABLE IV.—EGGS PER GRAM OF FECES PRIOR TO MEDICATION

| Animal No. | Day—3 | | | | Day—2 | | | | Day—1 | | | |
|---|---|---|---|---|---|---|---|---|---|---|---|---|
| | N | S | P | Total | N | S | P | Total | N | S | P | Total |
| I-A | 0 | 440 | 2,920 | 3,360 | 40 | 480 | 1,160 | 1,680 | 40 | 440 | 1,120 | 1,600 |
| I-B | 0 | 520 | 600 | 1,120 | 40 | 0 | 1,720 | 1,760 | 40 | 0 | 1,680 | 1,720 |
| II-A | 0 | 0 | 1,400 | 1,400 | 0 | 0 | 1,080 | 1,080 | 0 | 0 | 1,080 | 1,080 |
| II-B | 0 | 440 | 1,040 | 1,480 | 0 | 840 | 960 | 1,800 | 40 | 760 | 1,240 | 2,040 |
| III-A | 0 | 0 | 5,120 | 5,120 | 0 | 0 | 4,880 | 4,880 | 0 | 0 | 2,960 | 2,960 |
| III-B | 0 | 0 | 3,720 | 3,720 | 0 | 0 | 2,520 | 2,520 | 40 | 1,040 | 1,880 | 2,960 |

Note.—N=Nematodirus; S=Strongyloides; P=Other (Haemonchus, Trichostrongylus, Bunostomum; Oesophagostomum, Chabertia, etc.).

TABLE V.—EGGS PER GRAM OF FECES AFTER TREATMENT

| Animal No. | Drug, mg./kg. | Day+1 | | | | Day+4 | | | | Day+7 | | | |
|---|---|---|---|---|---|---|---|---|---|---|---|---|---|
| | | N | S | P | Total | N | S | P | Toral | N | S | P | Total |
| I-A | 30 aq [1] | 0 | 0 | 0 | 0 | 0 | 0 | 0 | 0 | 0 | 120 | 0 | 120 |
| I-B | 30 aq [1] | 0 | 160 | 0 | 160 | 0 | 40 | 0 | 40 | 0 | 240 | 0 | 240 |
| II-A | 30 em [2] | 0 | 0 | 40 | 40 | 0 | 0 | 0 | 0 | 0 | 0 | 0 | 0 |
| II-B | 30 em [2] | 0 | 120 | 0 | 120 | 0 | 80 | 120 | 200 | 0 | 40 | 0 | 40 |
| III-A | None | 0 | 0 | 2,000 | 2,000 | 0 | 0 | 1,880 | 1,880 | 0 | 0 | 2,600 | 2,600 |
| III-B | do | 0 | 0 | 2,240 | 2,240 | 0 | 0 | 1,760 | 1,760 | 0 | 0 | 2,680 | 2,680 |

[1] aq=Aqueous solution 20%.  [2] em=Emulsion 20%.

From these data it is seen that 2-(2-thenylmercapto)-Δ²-imidazoline as the free base or hydrochloride salt is 100% effective in reducing the egg counts of Haemonchus and related species.

Similar significant reduction in egg counts are obtained when this agent is administered to cattle, dogs and goats.

Example IX

In a further study to determine the effectiveness of 2-(2-thenylmercapto)-Δ²-imidazoline hydrochloride against gastrointestinal nematodes of sheep, the agent is administered subcutaneously at a 20% aqueous solution to four pairs of randomly selected, naturally infested sheep at dosages of 10, 15, 20 and 25 mg./kg., respectively. A fifth pair is held as control.

Egg counts are made on the three days preceding the treatment and on the third, sixth and tenth days following treatment. Results are reported in Tables VI and VII, respectively.

The average egg production per gram of feces (E.P.G.) before and after medication and the percentile reduction therein of all nematodes and of Haemonchus are presented in Table VIII.

TABLE VIII

| Sheep | Average E.P.G. | | Percent Reduction | Average E.P.G. Haemonchus | | Percent Reduction |
|---|---|---|---|---|---|---|
| | Before | After | | Before | After | |
| IV-A | 1,826 | 313 | 82.86 | 1,573 | 173 | 89.00 |
| IV-B | 2,536 | 705 | 72.20 | 2,026 | 67 | 96.69 |
| V-A | 1,875 | 160 | 91.47 | 1,600 | 67 | 95.81 |
| V-B | 1,983 | 732 | 61.28 | 1,673 | 26 | 98.39 |
| VI-A | 900 | 13 | 98.56 | 673 | 0 | 100.00 |
| VI-B | 2,293 | 13 | 99.43 | 1,693 | 0 | 100.00 |
| VII-A | 1,800 | 453 | 74.83 | 1,507 | 0 | 100.00 |
| VII-B | 2,546 | 200 | 92.14 | 1,253 | 0 | 100.00 |
| VIII-A | 2,386 | 2,173 | | 2,387 | 2,173 | |
| VIII-B | 2,240 | 2,386 | | 1,880 | 2,360 | |

Thus, 2-(2-thenylmercapto)-Δ²-imidazoline hydrochloride at doses of 20 and 25 mg./kg. reduced the egg production of Haemonchus 100% while doses of 10–15 mg./kg. gave reductions of 92 and 97% (average), respectively. The total egg production is reduced to levels of about 84% to 99%. Gastrointestinal infestations of cattle, horses, dogs and goats respond in a similar manner.

Example X

Repetition of the procedure of Example VIII but using the products of Example V and those listed below in place of 2-(2-thenylmercapto)-$\Delta^2$-imidazoline hydrochloride gives substantially the same results.

2-(2-thenylmercapto)-$\Delta^2$-imidazoline sulfate
2-(2-thenylmercapto)-$\Delta^2$-imidazoline acetate
2-(2-thenylmercapto)-$\Delta^2$-imidazoline citrate
2-(2-thenylmercapto)-$\Delta^2$-imidazoline gluconate
2-(2-thenylmercapto)-$\Delta^2$-tetrahydropyrimidine [1]
2-(2-thenylmercapto)-$\Delta^2$-tetrahydropyrimidine acetate
2-(2-thenylmercapto)-$\Delta^2$-tetrahydropyrimidine citrate
2-(3-methyl-2-thenylmercapto)-$\Delta^2$-imidazoline citrate
2-(4-methyl-2-thenylmercapto)-$\Delta^2$-imidazoline citrate
2-(3-chloro-2-thenylmercapto)-$\Delta^2$-imidazoline citrate
2-(4-chloro-2-thenylmercapto)-$\Delta^2$-imidazoline citrate
2-(3-bromo-2-thenylmercapto)-$\Delta^2$-imidazoline citrate
2 - (2 - thenylmercapto) - 5 - methyl - $\Delta^2$ - tetrahydropyrimidine acetate
2-(3-methyl-2-thenylmercapto)-5-methyl-$\Delta^2$-tetrahydropyrimidine acetate
2 - (3,4 - dimethyl - 2 - thenylmercapto) - 5 - methyl - $\Delta^2$ - tetrahydropyrimidine acetate
1-methyl-2-(2-thenylmercapto)-$\Delta^2$-imidazoline citrate

Example XI

The larvacidal activity of 2-(2-thenylmercapto)$\Delta^2$-imidazoline hydrochloride against larvae of Haemonchus, Trichostrongylus and Strongyloides cultured from the fecal material of sheep is determined as follows:

Fecal material is cultured at 23° C., the filariform larvae removed, placed in a saline solution and counted by the dilution method. Approximately 1000 larvae are then placed on watch glasses to which various concentrations of anthelmintic agent are added (0.1%–20%). The final volume of solution is 10 ml. in each case. The mixing of larvae and anthelmintic agent is done under a dissecting microscope and the immobilization time and actual death time noted.

The filariform larvae have a rather fast undulating motion. Upon addition of 2-(2-thenylmercapto)-$\Delta^2$-imidazoline hydrochloride, the larvae lose their progressive undulating motion but continue to exhibit slow local undulations. The thus immobilized larvae soon die. The lethal time records the time interval after which the last larvae dies. Most larvae die in a shorter period.

TABLE IX

| Agent, percent (W/V) | Immobilization time in Seconds | Lethal Time in Minutes |
| --- | --- | --- |
| 20 | 7 | 2 |
| 15 | 20 | 5 |
| 10 | 30 | 8 |
| 5 | 45 | 12 |
| 1 | 60 | 15 |
| 0.5 | 90 | 25 |
| 0.1 | 180 | 35 |

The higher concentrations, as expected, are exceptionally rapid in their larvacidal action. The products referred to in Examples II–VI and X exhibit similar larvacidal action.

[1] Used as a 20% aqueous suspension.

Example XII

Repetition of the procedure of Example VIII but using the intramuscular route of administration rather than the subcutaneous route also effectively reduces the egg count to substantially the same degree.

Example XIII

Five Sheep, naturally infected with gastrointestinal helminths, are selected at random and divided into two groups comprising 3 and 2 sheep, respectively. Group I (3 sheep) is administered a 20% sterile aqueous solution of 2-(2-thenylmercapto)-$\Delta^2$-imidazoline hydrochloride subcutaneously at the rate of 30 mg./kg. body weight, with 150 (U.S.P.) units of hyaluronidase. Group II (2 sheep) is used as untreated control and administered only sterile water.

From the results tabulated in Table X below it is obvious that 2-(2-thenylmercapto)-$\Delta^2$-imidazoline hydrochloride is very effective against gastrointestinal nematodes of sheep. The hyaluronidase completely eliminated the local tissue irritation as evidenced by the absence of edema. Egg counts are made on each of the three days preceding treatment and five times after treatment at three-day intervals.

TABLE X.—EGGS PER GRAM OF FECES

| Sheep No. | Wt. in lbs. | Drug in mg./kg. | Days Before Medication | | | Days After Medication | | | | |
| --- | --- | --- | --- | --- | --- | --- | --- | --- | --- | --- |
| | | | -3 | -2 | -1 | +3 | +6 | +9 | +12 | +15 |
| 1 | 119 | 30+Hy [1] | 5,840 | 4,280 | 4,520 | [2] 80 | [2] 80 | [2] 40 | [2] 80 | 0 |
| 2 | 124.5 | 30+Hy [1] | 1,820 | [2] 3,000 | 2,560 | [2] 760 | [2] 440 | [2] 120 | [2] 760 | [2] 1,000 |
| 3 | 95 | 30+Hy [1] | 1,360 | 1,800 | 1,280 | 0 | [2] 80 | [2] 80 | 0 | [2] 40 |
| 4 | 116 | H$_2$O | 4,760 | 11,000 | 9,440 | 1,440 | 1,720 | 1,200 | 1,200 | 1,080 |
| 5 | 105 | H$_2$O | 7,800 | 6,520 | 7,160 | 7,760 | 10,640 | 6,840 | 7,800 | 7,280 |

[1] Hy=150 units hyaluronidase. [2] Strongyloides.

Example XIV

Repetition of this procedure using 100, 250, 500 and 1000 (U.S.P.) units of hyaluronidase gives similar results. A slight edema was noted at 100 (U.S.P.) units of hyaluronidase.

Example XV

The procedure of Example XIII is repeated but using 2-(2-thenylmercapto)-$\Delta^2$-imidazoline hydrochloride at levels of 10, 20, 40 and 60 mg./kg. of body weight. The 10 mg./kg. dose gives about a 90% reduction in egg production. The other levels produce complete reduction of egg production. In each instance no evidence of edema is observed.

Example XVI

A sheep, raised from birth in a special pen, and free from gastrointestinal nematodes is subcutaneously injected with 20 mg./kg. of body weight of a 20% aqueous solution of 2-(2-thenylmercapto)-$\Delta^2$-imidazoline hydrochloride. The following day the sheep is turned out to pasture with sheep naturally infested with digestive Strongyles. Two weeks later the sheep is removed from the flock. Examination of its feces showed no egg burden. Postmortem examination showed the animal to be free of nematodes.

Repetition of this experiment with 2-(2-thenylmercapto)-$\Delta^2$-imidazoline, 20 mg./kg. of body weight as a 20% aqueous suspension; 2-(2-thenylmercapto)-$\Delta^2$-tetrahydropyrimidine hydrochloride and 1-methyl-2-(2-thenylmercapto)-$\Delta^2$-imidazoline hydrochloride, each at 20 mg./kg. of body weight as a 20% aqueous solution, gives similar results.

Example XVII

A pen previously occupied for two weeks by two sheep naturally infested with digestive Strongyles is sprayed with a 20% aqueous solution of 2-(2-thenylmercapto)-$\Delta^2$- imidazoline hydrochloride at the rate of 0.5 gallon per 1000 square feet after removal of the infected sheep. The following day two nematode-free sheep are placed in the enclosure. Daily checks of their feces for two weeks followed by post-mortem examination showed no nematode infestation.

What is claimed is:

1. The method for the veterinary control of helminthiasis which comprises the parenteral administration to an animal of from about 10 mg./kg. to about 60 mg./kg. of body weight of 2-(2-thenylmercapto)-$\Delta^2$-5-methyltetrahydropyrimidine.

2. The method for the veterinary control of helminthiasis which comprises the parenteral administration to an animal of from about 10 mg./kg. to about 60 mg./kg. of body weight of 2-(2-thenylmercapto)-$\Delta^2$-tetrahydropyrimidine.

References Cited

UNITED STATES PATENTS

| 2,956,923 | 10/1960 | Kent | 167—53 |
| 3,291,688 | 12/1966 | Conover | 167—53 |
| 2,891,062 | 6/1959 | Ursprung | 167—55 |

OTHER REFERENCES

The Merck Veterinary Manual, Merck & Co. Inc., 1961, p. 885.

ALBERT T. MEYERS, *Primary Examiner.*

R. BARRESE, *Assistant Examiner.*